United States Patent Office 3,600,368
Patented Aug. 17, 1971

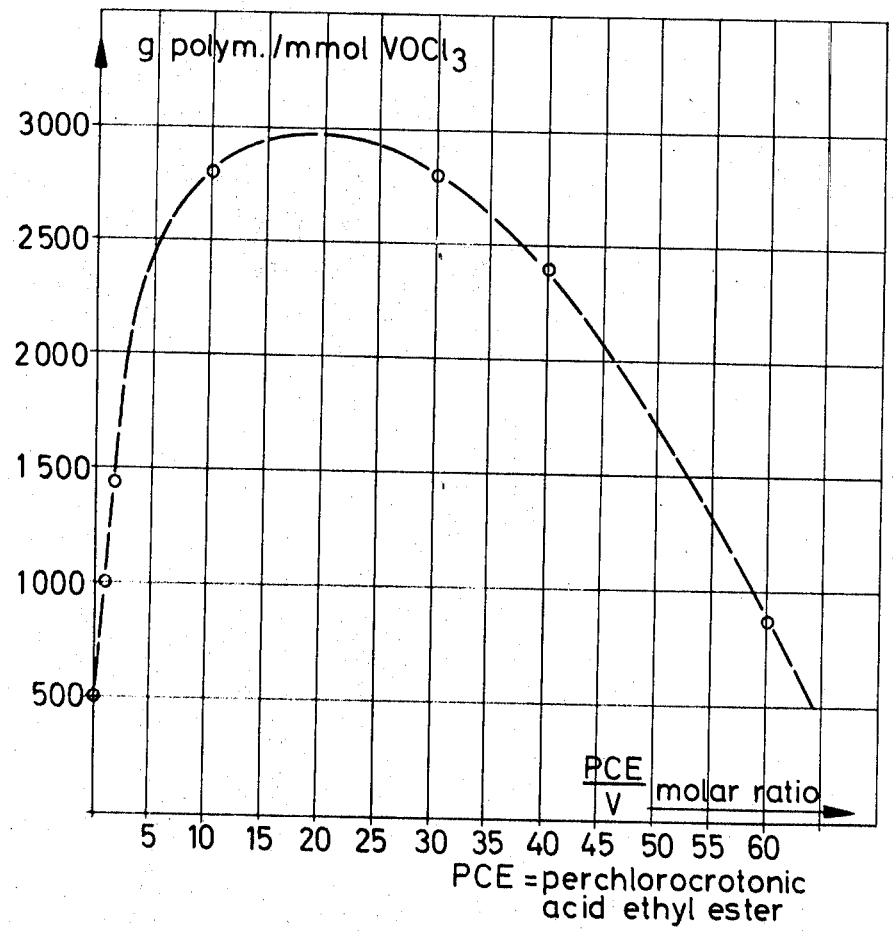

3,600,368
PROCESS FOR THE MANUFACTURE OF AMORPHOUS COPOLYMERS
Helmut Schaum, Bad Soden, Taunus, and Hans Emde and Kurt Benedikter, Marl, Germany, assignors to Buna-werke Huls Gesellschaft mit beschrankter Haftung, Marl, Germany
Filed Apr. 1, 1968, Ser. No. 717,760
Claims priority, application Germany, Apr. 5, 1967, F 52,030
Int. Cl. C08f 15/40
U.S. Cl. 260—80.78   14 Claims

ABSTRACT OF THE DISCLOSURE

The present invention relates to a process for the manufacture of copolymers from ethylene and higher α-olefins in suspension with modified organometal mixed catalyst. The mixed catalysts are modified by the addition of certain amounts of a perchlorocrotonic acid halide or ester respectively. This modification results in a catalyst system which is active enough as to avoid an aqueous working-up procedure and regeneration of the solvent.

---

The present invention relates to a process for the manufacture of amorphous copolymers from ethylene and higher α-olefins in suspension with modified organometal mixed catalysts.

It has been proposed to transform ethylene by the so-called low pressure process into high molecular weight copolymers with the aid of organometal mixed catalysts, known as Ziegler catalysts, under a pressure in the range of from 0 to 30 atmospheres gauge and at a temperature ranging from −30 to +150° C. It has also been proposed to copolymerize ethylene with α-olefins in the presence of these catalysts to yield copolymers.

When a relatively high proportion of higher α-olefin is used (above about 25% by weight) the copolymer obtained in this manner is amorphous and can be used as rubber. Rubberlike copolymers containing a higher proportion of α-olefins are soluble in aliphatic, aromatic and cycloaliphatic hydrocarbons and in a series of halohydrocarbons, for example carbon tetrachloride, tetrachloroethylene and trichloroethylene. The monomer mixture is mostly polymerized in the specified solvents and the copolymer is obtained in the form of a highly viscous solution (solution polymerization).

The highly viscous copolymer solutions have, however, the serious drawback that in the solvents a relatively small amount of copolymer can be dissolved only (about 50 to 100 grams per liter of solvent). It is thus necessary to use large amounts of solvent which must be agitated and then removed to obtain the copolymer. Moreover, for stirring and agitating the highly viscous solutions high amounts of energy are required.

Still further, it has been proposed to modify the catalyst by small amounts of additives. According to a known process a small amount of an α-halogen-carboxylic acid is added to the catalyst.

It has also been proposed to produce amorphous copolymers by copolymerizing mixtures of α-olefins, possibly with diolefins, in homogeneous phase with the aid of modified organometal mixed catalysts obtained by reacting vanadium compounds that are soluble in inert organic solvents with organo-aluminum compounds and halogen-containing cyclo-olefins. Moreover, it has been proposed to copolymerize ethylene with α-olefins in the presence of catalysts obtained by reacting a tri- to pentavalent vanadium compound with organo-aluminum compounds in the presence of an aliphatic halogen compound of the general formula $C(X)_3Y$ in which X stands for a halogen atom and Y represents a radical of the following composition:

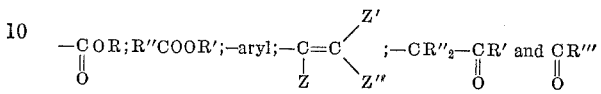

in which R and R' stand for halogen, alkyl, halogenoalkyl, aryl, halogenoaryl or alkylaryl, R'' is alkylene, R''' stands for alkyl, halogenoalkyl, aryl, or alkylaryl, Z is hydrogen, halogenoalkyl, aryl and halogenoaryl and Z' and Z'' stand for halogen, halogenoalkyl, alkyl, aryl and halogenoaryl.

Still further, it has been proposed to carry out the copolymerization in liquids that do not dissolve the polymer. The number of suitable dispersion media is, however, limited because most of the known dispersion media are polar with respect to the rubber-like copolymers and react with the catalyst which thereby loses its activity.

In the process of British Pat. 849,112 there are used as halohydrocarbons for the preparation of suspensions of copolymers of the aforesaid kind, for example, methylene chloride, ethyl chloride, 1,2-dichloroethane, and 1,1,2-trifluorotrichloroethane.

British Pat. 925,468 proposes for the preparation of suspensions of rubber-like copolymers of the aforesaid kind methylene chloride, ethyl chloride and 1,2-dichloroethane and uses a temperature which does not exceed the boiling point of the said dispersion media or 50° C. The copolymers are worked up by extracting the catalyst with water after interrupting the polymerization with alcohol or water. It has been desirable to develop a process in which the catalyst efficiency, i.e. the polymer yield calculated on the amount of catalyst used, is improved to an extent such that the catalyst may remain in the product without extraction while the dispersion medium separated by filtration can be re-used without purification and the major proportion of the organo-aluminum compound of the catalyst is preserved for another polymerization. This is only possible, however, if the polymer yield is substantially increased with respect to the amount of catalyst used.

The present invention provides a process for copolymerizing ethylene with α-olefins of the formula

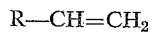

in which R stands for an aliphatic, branched or straight-chain hydrocarbon radical having less than 7 carbon atoms, possibly together with a diolefin in an amount such that the formed terpolymer has an iodine number of at most 50, in suspension under a pressure in the range of from 0 to 30 atmospheres gauge and at a temperature ranging from −30 to +50° C., while stirring or mechanically agitating the suspension which comprises carrying out the polymerization in a halohydrocarbon as dispersion media which does not dissolve the copolymer under the reaction conditions using a coordination catalyst comprising a tri- to penta-valent vanadium compound and an organo-aluminum compound both soluble in the dispersion medium used, with (1) A vanadium concentration in the range of from 0.001 to 0.1 millimole per liter of dispersion medium, (2) A ratio of aluminum to vanadium in the range of from 20 to 200, preferably 30 to 100, in the presence of (3) 5 to 50 moles, preferably 2 to 20 moles, calculated on the vanadium compound, of a perchlorocrotonic acid derivative of the formula $$Cl_3C—CCl=CCl—COX$$

in which X is a chlorine or bromine atom or the radical —OR, R being a possibly halogenated alkyl, cycloalkyl, aryl or aralkyl radical.

The perchlorocrotonic acid derivative is a constituent of the catalyst and is not incorporated into the copolymer. The addition of a compound of this kind surprisingly increases the yield under otherwise comparable conditions to six times the value when the polymerization is carried out in the specified dispersion media which do not dissolve the rubber. When the olefins are copolymerized in solution in a hydrocarbon such as hexane or a chlorohydrocarbon such as tetrachloroethylene the yield is increased by about 200% only.

Owing to the high catalyst efficiency the use of the aforesaid reactivator, the indicated amounts of catalyst and the specified ratio of the catalyst components enables the polymerization batch to be worked up without the addition of water by filtration. It is thus not necessary to free the copolymer or the dispersion medium from water or alcohol as in a known process, traces of which H-acid compounds would deactivate the catalyst. The copolymers produced by the process of the invention have a very low ash and chlorine content.

As catalysts for the copolymerization of ethylene with higher α-olefins and possibly doubly unsaturated compounds there are used coordination catalysts which are soluble in the dispersion medium and comprise (a) A vanadium compound, for example $VOCl_3$, $VCl_4$, vanadium trisacetylacetonate, vanadium hydroxydiacetylacetonate, vanadium naphthenate, vanadium benzoate, or vanadium esters such as $$VO(OC_4H_9\text{—}i)_3, VO(OC_3H_7\text{—}i)_3$$
$$VO(OC_2H_5)Cl_2, VO(OC_2H_5)_2Cl$$

and prefrably $VOCl_3$, (b) An organo-aluminum compound of the general formula $AlR_nX_{3-n}$, in which R stands for alkyl, X is halogen and n is 1, 2, or 3, for example $$Al_2(C_2H_5)_3Cl_3, Al(C_2H_5)_2Cl, Al(C_2H_5)Cl_2$$
$$Al_2(C_4H_9\text{—}i)_3Cl_3, Al(C_4H_9\text{—}i)_2Cl, Al(C_4H_9\text{—}i)Cl_2$$

preferably $Al_2R_3Cl_3$, or a compound of the formula $AlR_3$, for example $Al(C_2H_5)_3$ and $Al(C_4H_9\text{—}i)_3$, or a polymeric organo-aluminum compound such as isoprenyl-aluminum, and (c) A perchlorocrotonic acid derivative as reactivator.

The substantial, unexpected advantage of the process of the invention resides in that owing to the extremely high activity of the modified Ziegler catalysts rubber-like copolymer of olefins are obtained with very high space-time yields.

Moreover, it is advantageous that with the modified Ziegler catalysts according to the invention chemically and physically very uniform products are obtained, probably because the olefins are more uniformly reacted, and that the vulcanization products thereof have improved mechanical properties.

In the process of British Pat. 925,468 a perchlorocrotonic acid derivative is not used as reactivator and the catalyst efficiency is much lower. If a copolymer produced in this manner were worked up without the use of water, the ash content would be considerably higher which could only be reduced by an extraction with water and/or alcohol as described above.

In the process of the invention the polymer is filtered off, quantitatively freed from the dispersion medium, which is then reconducted into the polymerization vessel. In this manner products are obtained in a multiple yield having a very low ash content as shown in the following comparative examples. It is likewise advantageous that the dispersion medium can be re-used without further treatment.

Owing to the low chlorine content of the copolymers produced by the process of the invention the corrosion in the further processing is greatly reduced.

The highly active catalyst is suitably formed in the polymerization vessel by introducing separately the solutions of the vanadium compound and of the organo-aluminum compound continuously in a constant ratio. The perchlorocrotonic acid derivative can be previously mixed with the vanadium compound or it can be metered in separately.

The catalyst components are preferably used in the form of solutions in the specified dispersion media which do not or scarcely dissolve the rubber.

The molar ratio of organo-aluminum compound to vanadium compound may vary within wide limits, for example from 20 to 200 and preferably from 30 to 100.

The perchlorocrotonic acid derivative is used in a molar ratio of reactivator to vanadium compound of 5 to 50 or more, preferably 5 to 20.

In the process of the invention the vanadium compound is used in a concentration of 0.001 to 0.1 millimole per liter of dispersion medium.

When the catalyst components are continuously added to the polymerization mixture and the polymerization is carried out discontinuously the indicated concentration is the final concentration which is reached when the mixture already contains a certain amount of polymer. In comparison with the process described in British Pat. 925,468, considerably smaller amounts of catalysts are required in the present process.

Elastic, rubber-like products capable of being cross-linked with sulfur can be obtained when a small amount of a doubly unsaturated compound (iodine number up to 50) is incorporated into the olefin copolymers, one double bond of which compound participates in the polymerization while the other double bond remains unchanged for the subsequent vulcanization with sulfur.

Suitable tercomponents for this purpose are, for example, 1,4-cis-hexadiene, 1,4-trans-hexadiene, alkenyl-norbornenes such as 5-(2' and/or 3'-methyl-2'-butenyl)-norbornene-2, alkylidene-norbornenes such as 5-methylene-norbornene-2 or 5-ethylidene-norbornene-2, dicyclopentadiene, butadiene-1,3 or isoprene.

In order to produce a rubber having good properties of use after vulcanization the catalyst system must be used in the form of a homogeneous solution.

In the process of the invention ethylene can be polymerized with propylene, butene-1, isobutene, pentene-1, hexene-1, 4-methyl-pentene-1 and other branched or straight-chain α-olefins having less than 9 carbon atoms, propylene being preferred. Ethylene and propylene are copolymerized in a proportion such that the copolymers obtained have elastic, rubber-like properties, that is to say the proportion of ethylene in the copolymer can be as high as 20 to 80% by weight, preferably 30 to 75% by weight.

The copolymerization is carried out at a temperature in the range of from —30° C. to +50° C., preferably —10° C. to +40° C. and under a pressure of from 0 to 30 atmospheres gauge, either batchwise or continuously.

When the polymerization is carried out in the presence of 0.0001 to 10% by weight, calculated on the dispersion medium, of a finely divided inert solid having a large surface and a particle size of from 0.005 to 100 microns which does not inhibit the polymerization activity and is insoluble both in the dispersion medium and the separating polymer, the polymer beads obtained do not agglomerate.

Suitable solids of this kind are, for example chlorides such as NaCl and KCl,
fluorides such as NaF, $CaF_2$, $KF\text{-}BF_3$, $2KF\text{-}SiF_4$, $Na_3AlF_6$,
sulfates such as $K_2SO_4$, $Na_2SO_4$, $CaSO_4$, $BaSO_4$, glauberite,
nitrates such as $NaNO_3$, $KNO_3$,
phosphates such as $Ca_3(PO_4)_2$, apatite, hydroxylapatite,
carbonates such as $CaCO_3$, $MgCO_3$, $Na_2CO_3$, $K_2CO_3$, $ZnCO_3$,
silicates such as talcum, kaolinite, $SiO_2$, for example in the form of xerogels, diatomite and Aerosil (registered trademark),
aluminum silicates such as feldspar and oligoklas,
aluminates such as spinel and zinc spinel,
borates such as $Na_2B_4O_7$,
oxides such as $Al_2O_3$, AlOOH, $Fe_2O_3$, PbO, $TiO_2$, ZnO, CaO, MgO, or finely divided polymers, for example polyethylene, polypropylene, poly-4-methyl-pentene-1, or polyacrylonitrile.

Suitable dispersion media in the process of the invention are methylene chloride, ethyl chloride, 1,2-dichloroethane, 1,2-dichloropropane, 1,1,2-trifluorotrichloroethane or other halohydrocarbons, provided that they do not dissolve the copolymer under the reaction conditions, preferably methylene chloride and 1,2-dichloroethane.

The polymers obtained by the process of the invention can be cross-linked with the aid of organic peroxides, if desired with the addition of sulfur at temperatures in the range of from 100 to 240° C. When diolefins are incorporated into the polymers by polymerization and sulfur or sulfur compounds as usually added in rubber industries and accelerators are used, the polymer can be vulcanized for several minutes or several hours at a temperature in the range of from 100 to 240° C.

The following examples serve to illustrate the invention but they are not intended to limit it thereto.

EXAMPLE 1

Suspension polymerization in methylene chloride in the presence of varying amounts of perchlorocrotonic acid ethyl ester In a glass vessel having a capacity of 3 liters, provided with a perforated blade stirrer of stainless steel, three ground in dropping funnels, a reflux condenser with connected mercury excess pressure valve, a gas inlet tube and thermometer, 1.8 liters of methylene chloride were saturated, with the exclusion of air and moisture, at 15° C. and atmospheric pressure while stirring, with a gas mixture consisting of 3 parts by volume of ethylene and 6 parts by volume of propylene. When the monomer mixture had the right composition for the production of uniform products 0.02 millimole of $VOCl_3$ and 10 millimoles of methylbutenyl norbornene were added at 15° C. to the methylene chloride saturated with ethylene and propylene in a ratio by volume of 1:2. Then ethylaluminum sesquichloride was dropped in (solution of 20 millimoles Al in 100 milliliters methylene chloride) until polymerization set in, detectable by the subatmospheric pressure formed in the vessel. The monomer mixture (ethylene/propylene/methylbutenyl-norbornene 2:1:0.02) was then introduced in an amount to compensate pressure and $VOCl_3$ (0.18 millimole in 100 milliliters of methylene chloride) and ethylaluminum sesquichloride (20 millimoles of Al in 100 milliliters of methylene chloride) were uniformly dropped into the polymerization batch during the course of 100 minutes. The amount of reactivator perchlorocrotonic acid ethyl ester was added to the solution of $VOCl_3$. The copolymer was obtained in the form of small balls which were filtered off and dried.

The products obtained had the following properties:
Reduced specific viscosity, determined at 135° C.
 with a 0.1% polymer solution in decahydronaphthalene _____ 3–3.5
Mooney viscosity $ML_4$ _____ 100–120
Percent by weight of propylene in polymer (determined by infrared spectroscopy) _____ 40–45
C=C/1000 C. (except Example 1a) (determined by iodine monochloride method without consideration of blind value) _____ 3.5–4.0

The yields obtained with the different ratios of perchlorocrotonic acid ethyl ester to vanadium oxitrichloride are indicated in Table 1.

The products obtained were vulcanized with sulfur by the usual method. At a vulcanization temperature of 150° C. a vulcanization period of 24 minutes was necessary to bring about a 90% reaction, a range corresponding to the vulcanization conditions of an ethylene/propylene terpolymer having the same degree of unsaturation.

TABLE 1

Discontinuous terpolymerization of ethylene, propylene and methylbutenyl-norbornene (MBN) with different molar ratios of perchlorocrotonic acid ethyl ester (PCE) to vanadium oxitrichloride.

Reaction condition:
  Dispersion medium _____ Methylene chloride.
  Ter-component _____ Methylbutenyl-norbornene (MBN).
  Molar ratio Al:V _____ 100:1.
  V concentration _____ 0.1 millimole per liter.

| Example | Ter-component | Molar ratio, PCE:V | Yield, grams | Catalyst efficiency, g. polymer/millimole $VOCl_3$ |
|---|---|---|---|---|
| 1a | | 0:1 | 146 | 730 |
| 1b | | 0:1 | 100 | 500 |
| 1c | MBN | 1:1 | 200 | 1,000 |
| 1d | MBN | 2:1 | 290 | 1,450 |
| 1e | MBN | 4:1 | 300 | 1,500 |
| 1f | MBN | 10:1 | 560 | 2,800 |
| 1g | MBN | 30:1 | 560 | 2,800 |
| 1h | MBN | 40:1 | 480 | 2,400 |
| 1i | MBN | 60:1 | 175 | 875 |

The accompanying graph illustrates the catalyst efficiency in the discontinuous terpolymerization of ethylene, propylene and methylbutenyl-norbornene with different molar ratios of perchlorocrotonic acid ethyl ester to vanadium oxitrichloride.

EXAMPLE 2

Suspension polymerization in methylene chloride in the presence of different amounts of perchlorocrotonic acid ethyl ester In a glass vessel having a capacity of 15 liters, provided with a perforated blade stirrer of stainless steel, three ground in dropping funnels, a reflux condenser with connected mercury excess pressure valve, a gas inlet tube and a thermometer, 9 liters of methylene chloride were saturated at 15° C. and atmospheric pressure while stirring and with the exclusion of air and moisture with a gas mixture consisting of 6 parts by volume of ethylene and 9 parts by volume of propylene. When the monomer mixture had the right composition for the production of uniform products there were added at 15° C. to the methylene chloride saturated with ethylene/propylene in a ratio by volume of 2:3, $\frac{1}{20}$ of the amount of $VOCl_3$ (0.05 millimole/10 l.) and 20 millimoles of the ter component (methylbutenyl-norbornene or ethylidene-norbornene). Ethylaluminum sesquichloride was then dropped in (0.25 molar solution in methylene chloride) until polymerization set in, detectable by the subatmospheric pressure formed in the reaction vessel. The monomer mixture (ethylene:propylene:methylbutenyl - norbornene or ethylidene-norbornene=1.5:1:0.034 or 0.047, i.e. the same amount by weight of the respective ter-components) was introduced in an amount to compensate pressure, 0.95 millimole of $VOCl_3$ together with the perchlorocrotonic acid ethyl ester, if any, and 50 millimoles of ethylaluminum sesquichloride, each time dissolved in 400 milliliters of methylene chloride were dropped in separately and uniformly during the course of 5 hours. The total amount of methylene chloride used was 10 liters. The copolymer was obtained in the form of small balls which were filtered off and freed from the adhering dispersion medium under reduced pressure.

The products obtained had the following properties:

Reduced specific viscosity, determined at 135° C. with a 0.1% by weight solution of the polymer in decahydronaphthalene _____ 2–23
Mooney viscosity $ML_4$ _____ 100–120
C=C/1000 C. (determined by the iodine monochloride method without consideration of the blind value of ethylene/propylene rubber) __ 3–4
Percent by weight of propylene (determined by IR spectroscopy) _____ About 45

The products obtained were vulcanized with the usual sulfur/accelerator system and the vulcanizates obtained had good properties. At a vulcanization temperature of 150° C., 24 minutes were required to obtain a 90% reaction. The products were entirely amorphous as determined by differential thermoanalysis.

TABLE 2

Discontinuous terpolymerization of ethylene, propylene and methylbutenyl-norbornene (MBN) or 5-ethylidene-norbornene-2 (EN) with different molar ratios of perchlorocrotonic acid ethyl ester to vanadium oxitrichloride.

Reaction conditions:
  Dispersion medium_____ Methylene chloride.
  Molar ratio Al:V_____ 100:1.
  V concentration_____ 0.1 millimole per liter.

| Example | Ter-component | Molar ratio, PCE:V | Yield, grams | Catalyst efficiency, g. polymer/mmole $VOCl_3$ |
|---|---|---|---|---|
| 2a | MBN | 0:2 | 640 | 640 |
| 2b | MBN | 20:2 | 1,715 | 1,715 |
| 2c | EN | 0:2 | 700 | 700 |
| 2d | EN | 20:2 | 1,590 | 1,590 |

EXAMPLE 3

Polymerization in methylene chloride with a vanadium concentration of 0.02 millimole per liter In a glass vessel having a capacity of 15 liters, provided with a perforated blade stirrer of stainless steel, three ground in dropping funnels, a reflux condenser with connected mercury excess pressure valve, a gas inlet tube and a thermometer, 9 liters of methylene chloride were saturated at 15° C., at atmospheric pressure with exclusion of air and moisture and while stirring with a gas mixture consisting of 8 parts by volume of ethylene and 7 parts by volume of propylene. When the dispersion medium was saturated ⅕ of the amount of $VOCl_3$ (0.04 millimole/10 l.) and 25 millimoles of 5-ethylidene-norbornene-2 (EN) were added and ethylaluminum sesquichloride (0.2 molar solution in methylene chloride) was dropped in until polymerization set in, detectable by the subatmospheric pressure formed in the reaction vessel. Ethylene/propylene/5-ethylidenenorbornene-2 in a ratio of 1.5:1:0.047 were introduced in an amount to compensate pressure and 0.16 millimole of vanadium oxitrichloride, together with the perchlorocrotonic acid ethyl ester, if any, and ethylaluminum sesquichloride (10 millimoles of Al) were dropped in uniformly during the course of 100 minutes. A total amount of 10 liters of methylene chloride was used. The copolymer was obtained in the form of small globes which were filtered off and freed from the adhering dispersion medium under reduced pressure. The properties of the polymer and of the vulcanizate obtained therefrom corresponded to those of the products of Examples 1 and 2. The increase in yield can be seen in Table 3.

TABLE 3

Discontinuous terpolymerization of ethylene, propylene and ethylidene-norbornene with a low vanadium concentration and with and without reactivator (perchlorocrotonic acid ethyl ester)

Reaction conditions:
  Dispersion medium_____ Methylene chloride.
  Ter-component_____ Ethylidene-norbornene.
  V concentration_____ 0.02 millimole per liter.
  Al:V_____ 50:1.

| Example | Molar ratio, PCE:V | Yield, grams | Catalyst efficiency, g. polymer/mmole $VOCl_3$ |
|---|---|---|---|
| 3a | 0:1 | 173 | 865 |
| 3b | 10:1 | 300 | 1,500 |

The ash content of a product according to the invention obtained by simple filtration to separate the methylene chloride in which the polymerization has taken place was compared with that of a commercial rubber.

|  | Rubber produced in suspension according to invention | Commercial product |
|---|---|---|
| Total ash content__ | 0.09 | 0.02 |
| Parts per million: |  |  |
| Al | 400 | 60 |
| V | 7 | 15 |
| Fe | 2 | 6 |
| Ti | 1 | 1 |
| Ca | 2 | 10 |
| Cl | 600 | 800 |

What is claimed is:

1. In the process of copolymerizing ethylene with α-olefins of the formula R—CH=$CH_2$ in which R stands for an aliphatic hydrocarbon radical having less than 7 carbon atoms, to rubber like copolymers having 20 to 80% by weight ethylene, optionally together with a diolefin in an amount such that the formed terpolymer has an iodine number of up to 50, in suspension, under a pressure in the range of from 0 to 30 atmospheres gauge, at a temperature ranging from −30 to +50° C., in the presence of a halohydrocarbon as the dispersion medium which halohydrocarbon does not dissolve the copolymer under the reaction conditions, while stirring or mechanically agitating the polymerization mixture, the improvement which comprises carrying out the copolymerization in the presence of (a) a coordination catalyst of tri- to pentavalent vanadium compounds and organoaluminum compounds which are both soluble in the dispersion medium used, the concentration of the vanadium compound being in the range of from 0.001 to 0.1 millimole per liter of dispersion medium, and the ratio of aluminum to vanadium being in the range of from 20 to 200, and in the presence of (b) 5 to 50 moles, calculated on the vanadium compound, of a perchlorocrotonic acid derivative of the formula $Cl_3C$—CCl=CCl—CO—X, in which X stands for Cl, Br or OR, R being alkyl, cycloalkyl, aryl, aralkyl or halogenated derivatives thereof.

2. The process of claim 1, wherein the aluminum compound is used in an amount of 30 to 100 moles, calculated on the vanadium compound.

3. The process of claim 1, wherein the perchlorocrotonic acid derivative is used in an amount of 5 to 20 moles, calculated on the vanadium compound.

4. The process of claim 1, wherein the vanadium compound is vanadium oxitrichloride.

5. The process of claim 1, wherein the aluminum compound is ethylaluminum sesquichloride.

6. The process of claim 1, wherein the dispersion medium is methylene chloride.

7. The process of claim 1, wherein the dispersion medium is 1,2-dichloroethane.

8. The process of claim 1, wherein the perchlorocrotonic acid derivative is perchlorocrotonic acid ethyl ether.

9. The process of claim 1, wherein the diolefin is 1,4-cis-hexadiene, 1,4-trans-hexadiene or dicyclopentadiene.

10. The process of claim 1, wherein the diolefin is an alkenylnorbornene.

11. The process of claim 1, wherein the diolefin is 5-(2'-methyl-2'-butenyl)-norbornene-2 or 5-(3'-methyl-2'-butenyl)-norbornene-2.

12. The process of claim 1, wherein the diolefin is a mixture of 5-(2'-methyl-2'-butenyl)-norbornene-2 and 5-(3'-methyl-2'-butenyl)-norbornene-2.

13. The process of claim 1, wherein the diolefin is an alkylidene-norbornene.

14. The process of claim 1, wherein the diolefin is 5-methylene-norbornene-2 or 5-ethylidene-norbornene-2.

References Cited

UNITED STATES PATENTS

| | | | |
|---|---|---|---|
| 3,210,332 | 10/1965 | Lyons | 260—93.7 |
| 3,251,901 | 5/1966 | Bacskai | 260—683.15 |
| 3,301,834 | 1/1967 | Christman | 260—80.5 |
| 3,380,981 | 4/1968 | Miller | 260—93.7 |

JOSEPH L. SCHOFER, Primary Examiner

R. S. BENJAMIN, Assistant Examiner

U.S. Cl. X.R.

260—88.2R; 252—429B